G. L. HOYT.
BAG FILLING MACHINE.
APPLICATION FILED NOV. 12, 1909.

977,632.

Patented Dec. 6, 1910.
10 SHEETS—SHEET 1.

Witnesses:
Raphaël Stetter
G. Blake

Inventor
G. L. Hoyt
By his Attorney
Robert M. Pierson

G. L. HOYT.
BAG FILLING MACHINE.
APPLICATION FILED NOV. 12, 1909.

977,632.

Patented Dec. 6, 1910.
10 SHEETS—SHEET 2.

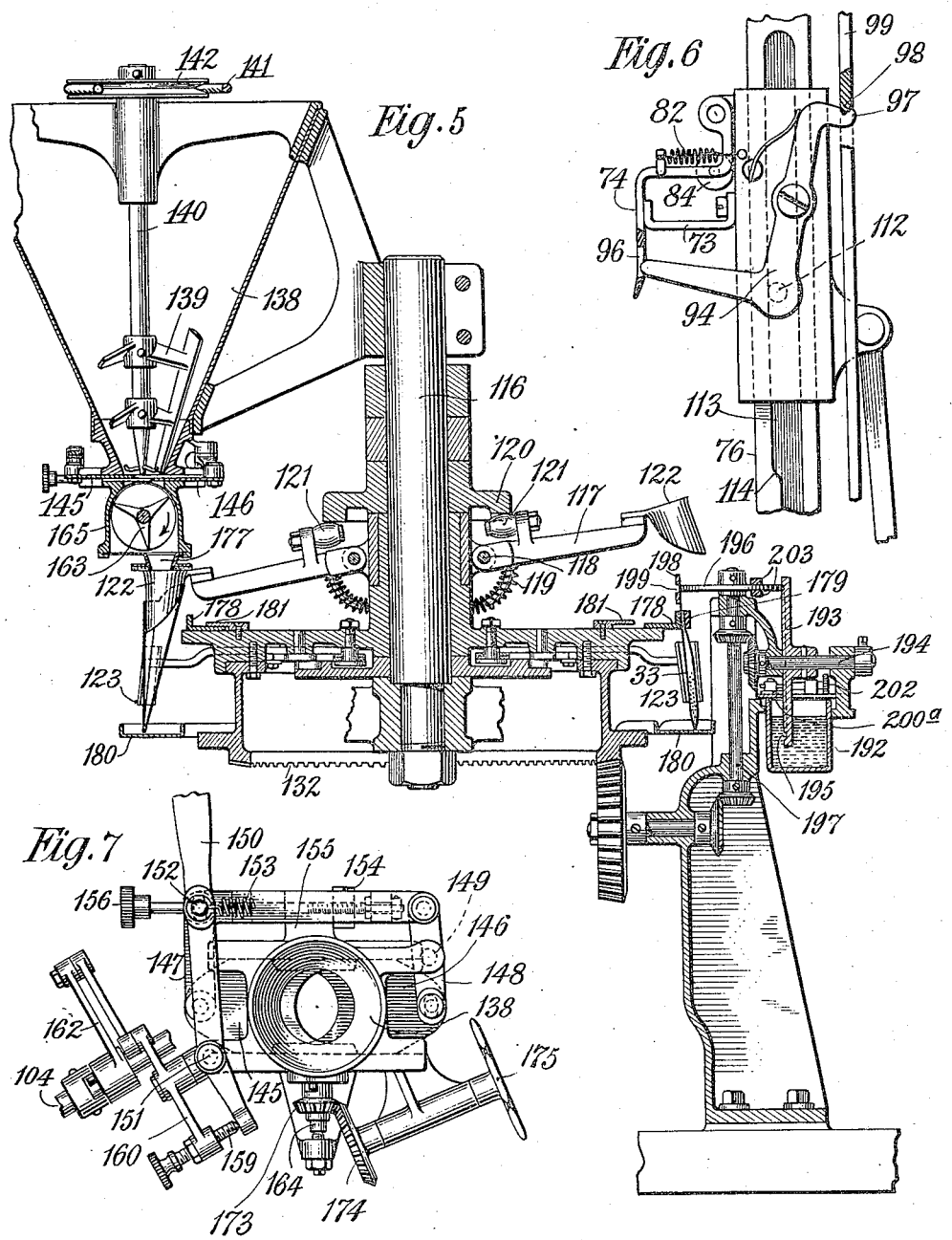

G. L. HOYT.
BAG FILLING MACHINE.
APPLICATION FILED NOV. 12, 1909.
977,632.
Patented Dec. 6, 1910.
10 SHEETS—SHEET 6.
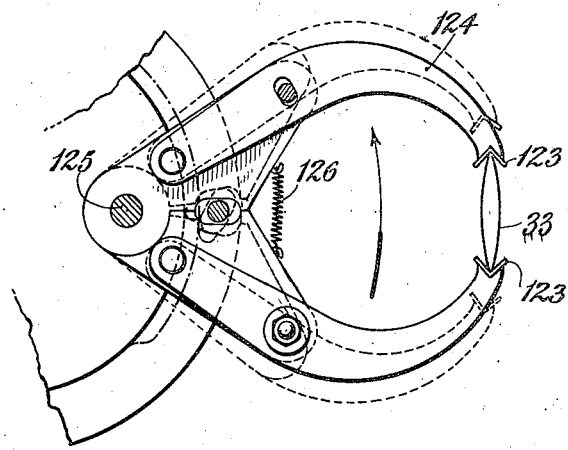
Fig. 9
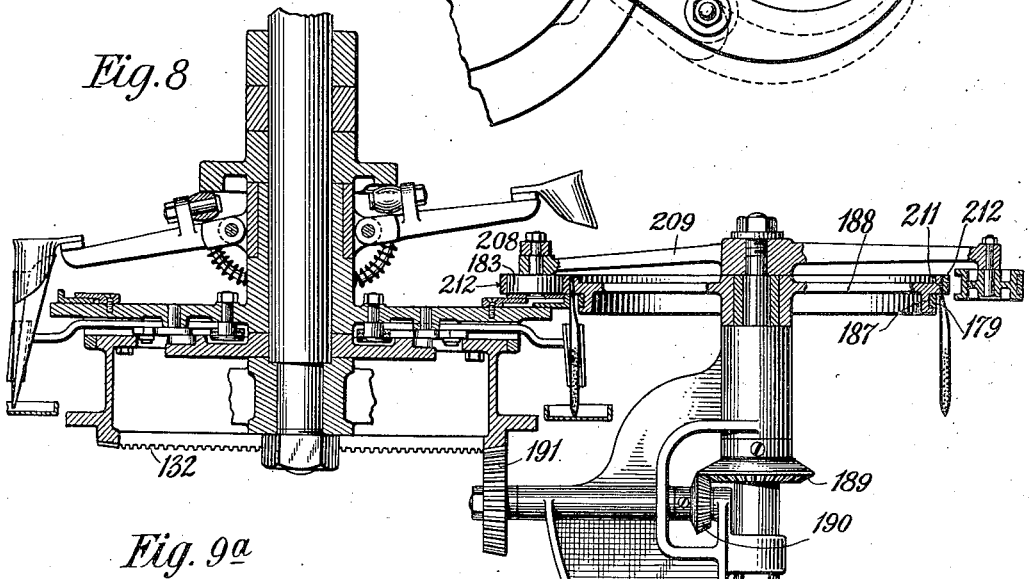
Fig. 8
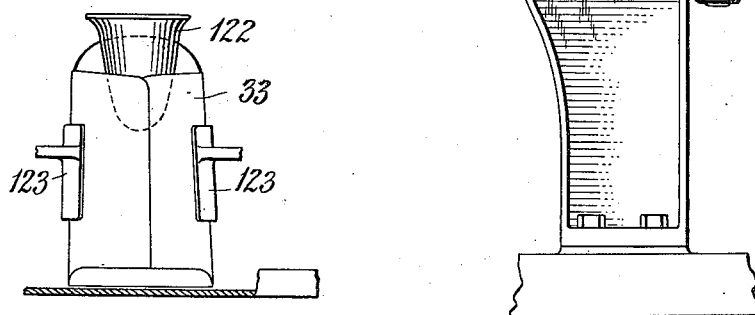
Fig. 9ª
Witnesses:
Raphaël Netter
G. Blake
Inventor
G. L. Hoyt
By his Attorney
Robert M. Pierson

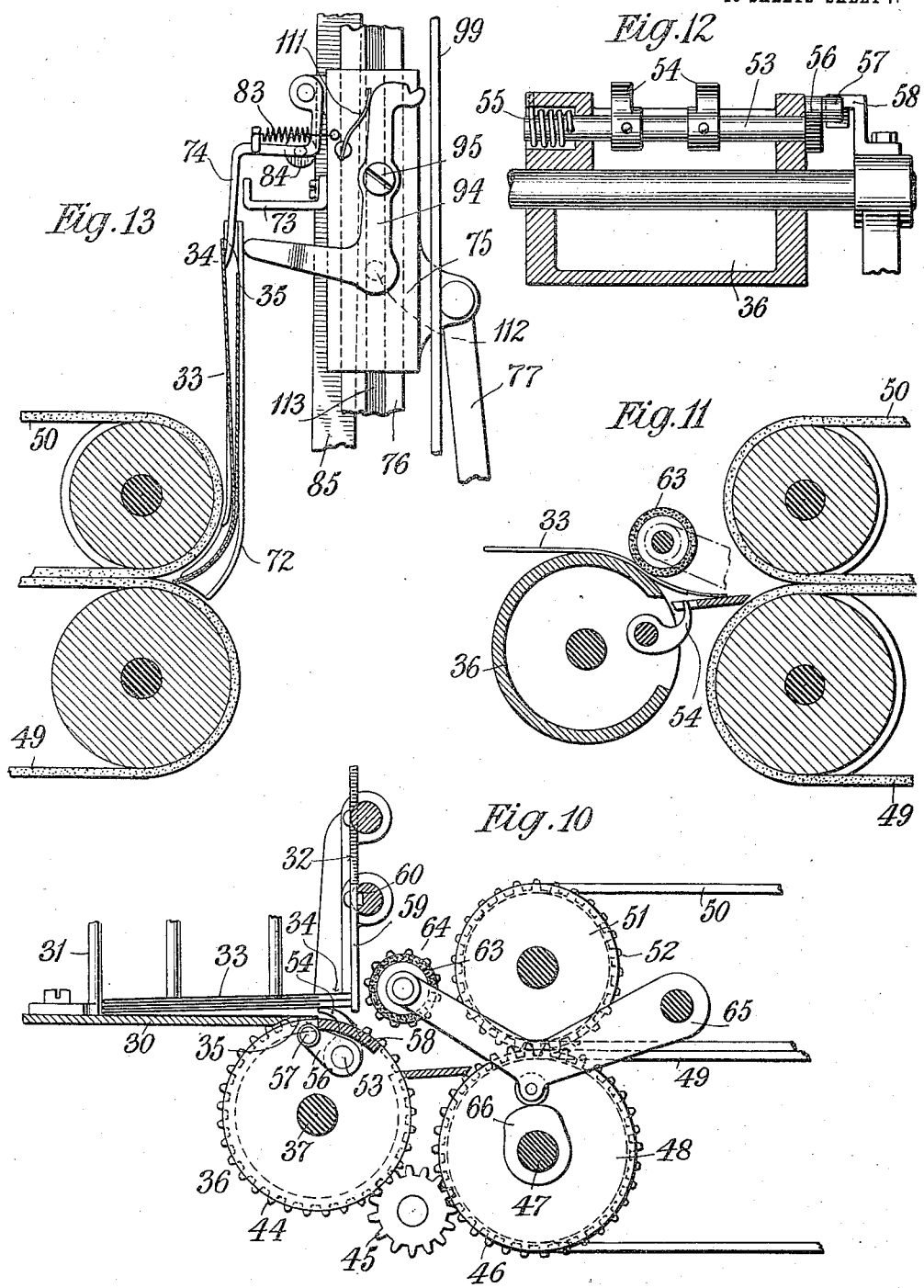

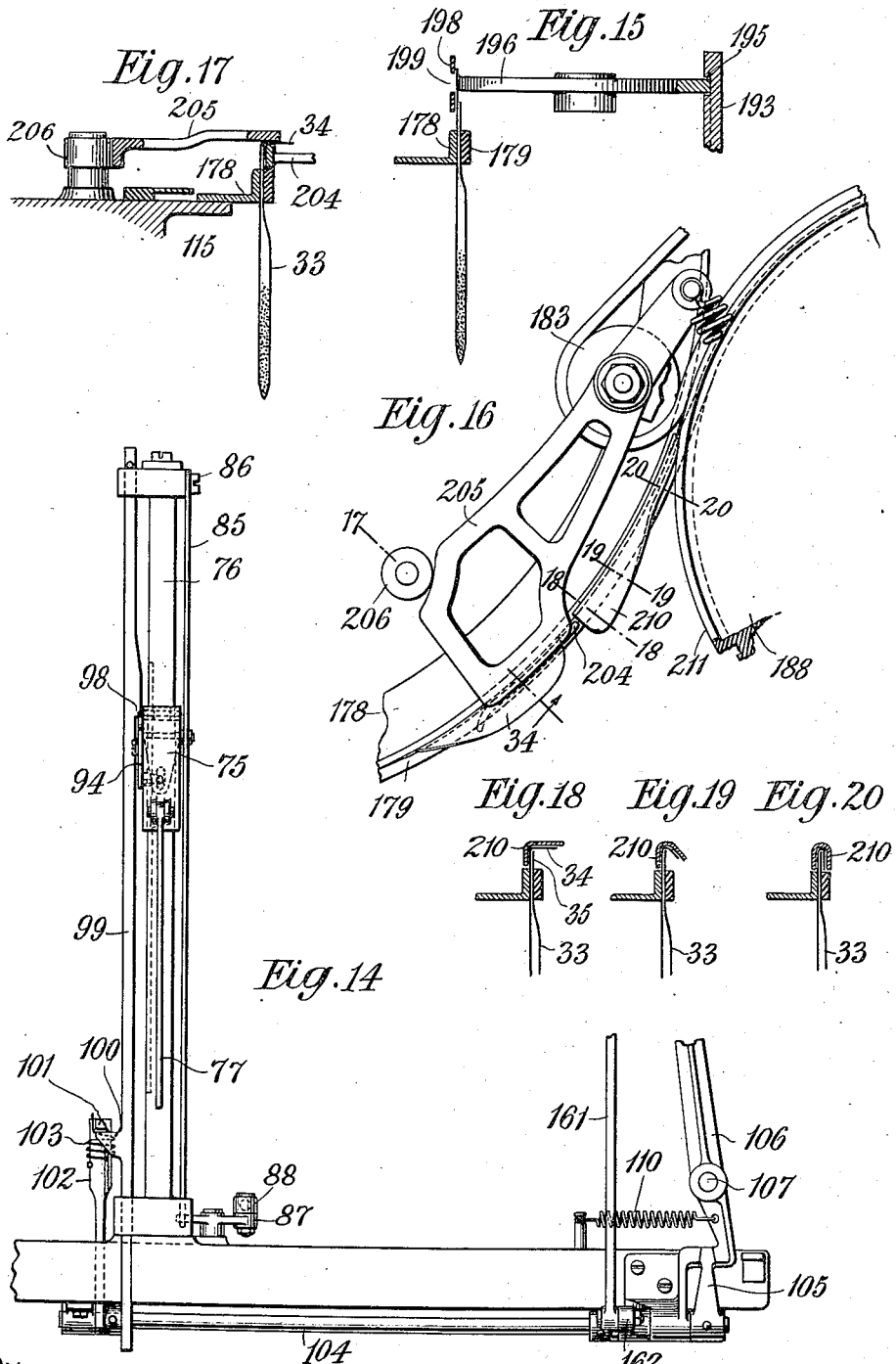

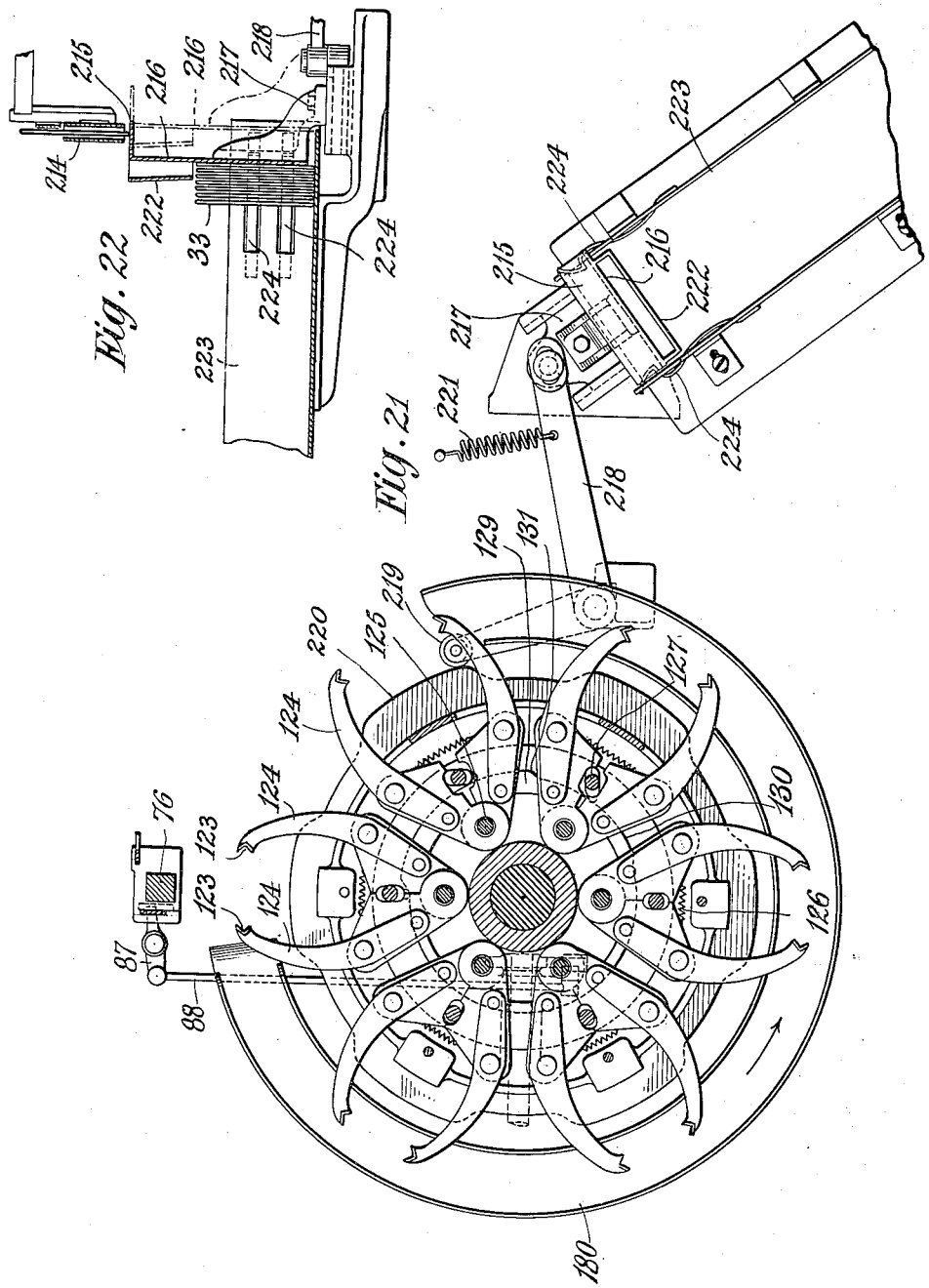

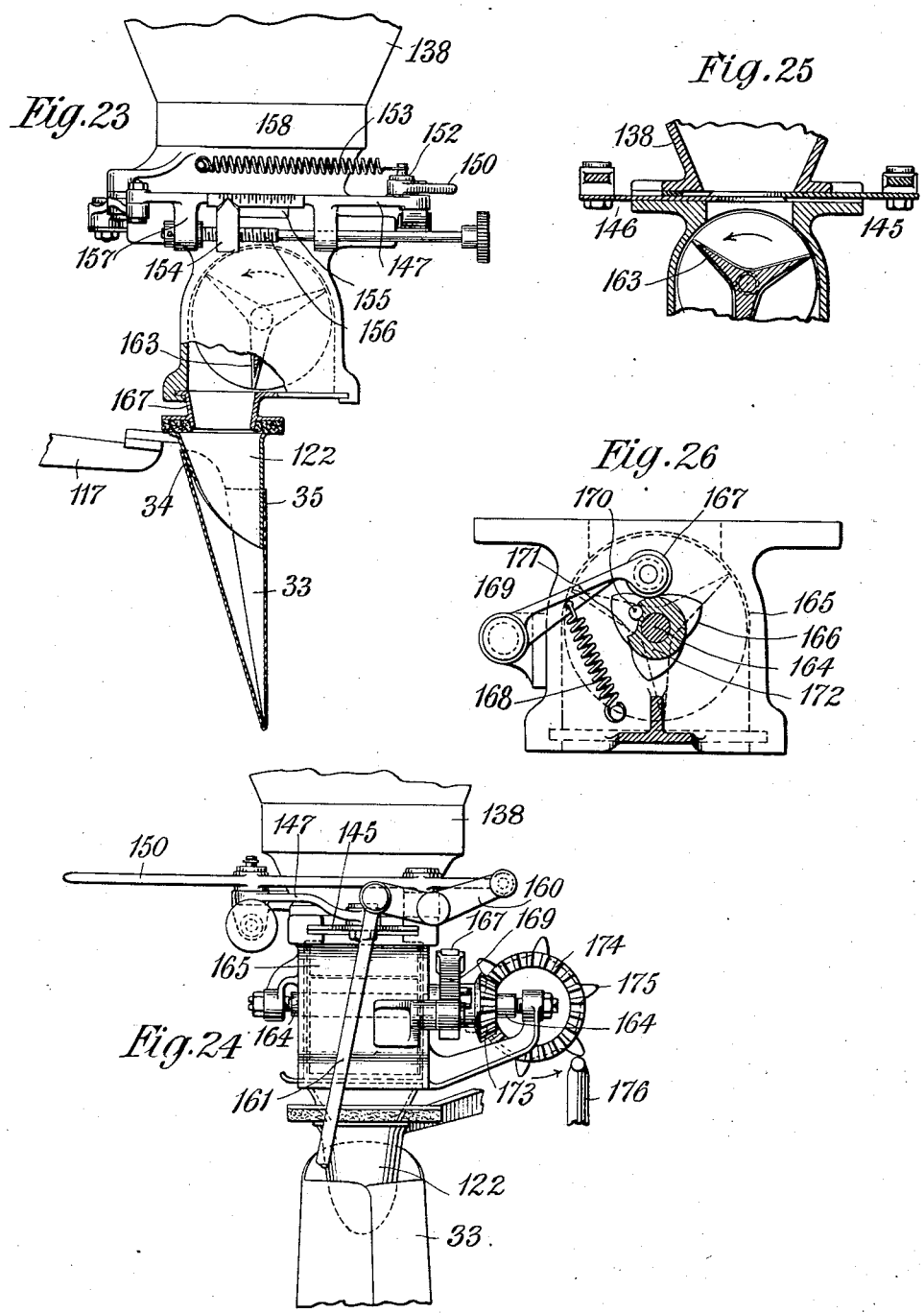

UNITED STATES PATENT OFFICE.

GUY L. HOYT, OF NEW YORK, N. Y., ASSIGNOR TO ROBERT GAIR COMPANY, OF BROOKLYN, NEW YORK, A CORPORATION OF NEW YORK.

BAG-FILLING MACHINE.

977,632.  Specification of Letters Patent.  Patented Dec. 6, 1910.

Application filed November 12, 1909. Serial No. 527,724.

*To all whom it may concern:*

Be it known that I, GUY L. HOYT, a citizen of the United States, residing at New York city, borough of Brooklyn, in the county of Kings and State of New York, have invented certain new and useful Improvements in Bag-Filling Machines, of which the following is a specification.

This invention relates to machines for automatically filling bags, such as flat envelops, with seed, powder or material of a like nature, and sealing the filled bags.

It embodies or may embody devices for taking the empty bags from a stack, charging them with the material, gumming, folding and pressing the flaps to seal the bags, and finally stacking the filled and sealed bags. To arrest the machine and stop the flow of material when the bags are absent or fail to feed properly, suitable stop-motion devices may be incorporated.

The object of my invention is to improve a machine of this character in its several functions as well as to provide a new mode of coördinating those functions, to the end that the efficiency and rate of output may be increased, greater durability secured, and economies effected in the cost of building and operating the machine.

Figure 1:
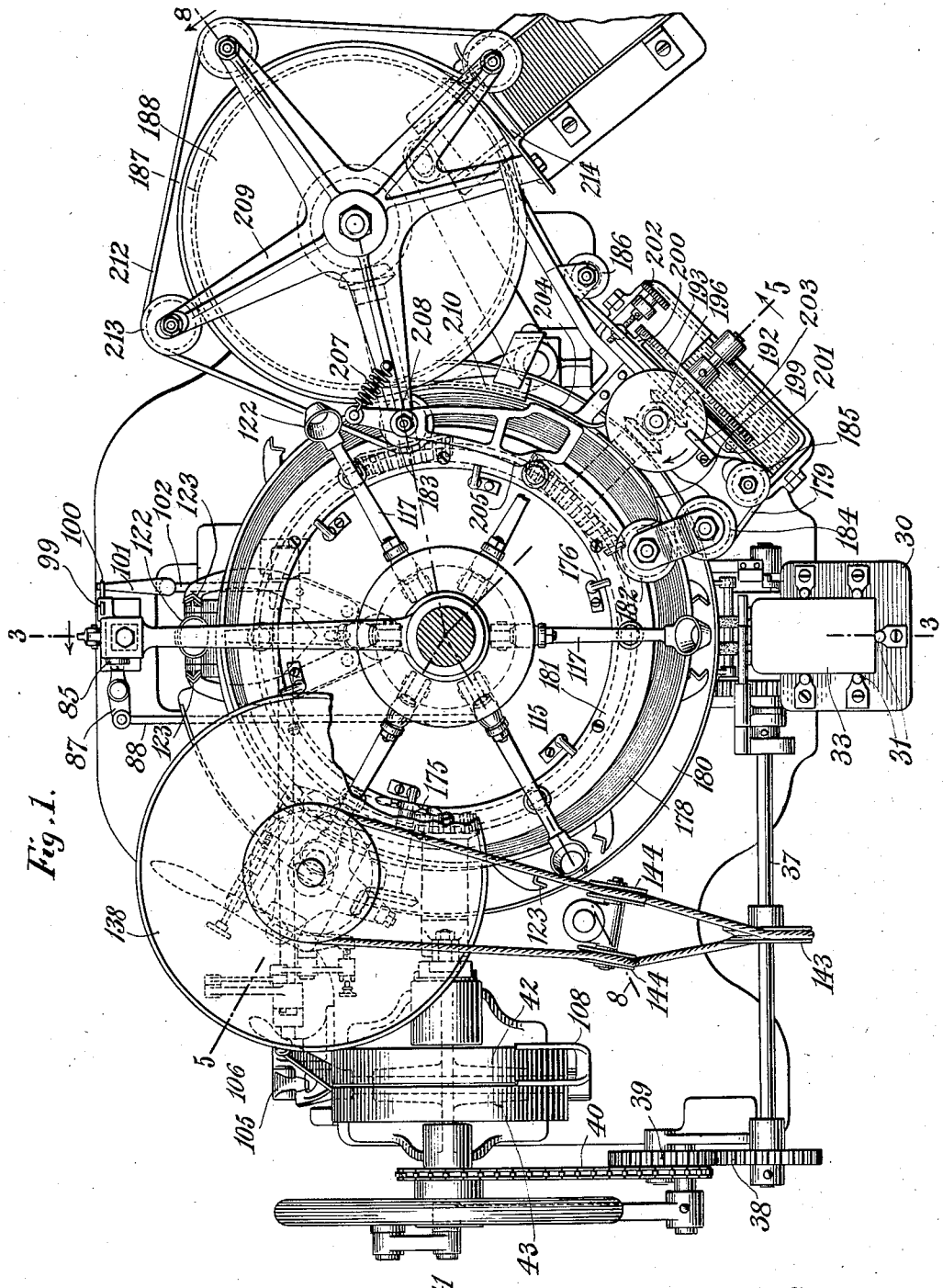
Figure 2:
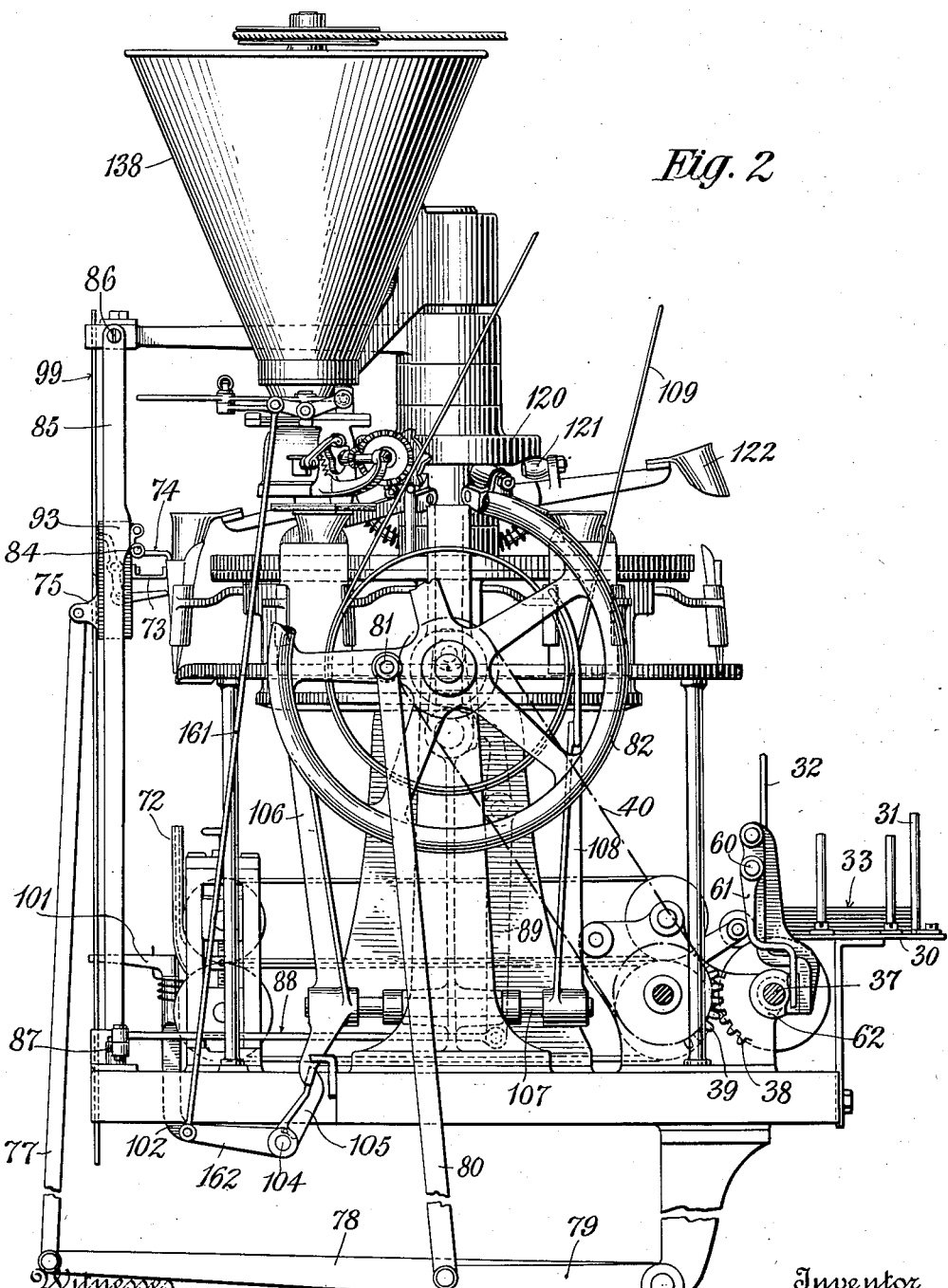
Figure 3:
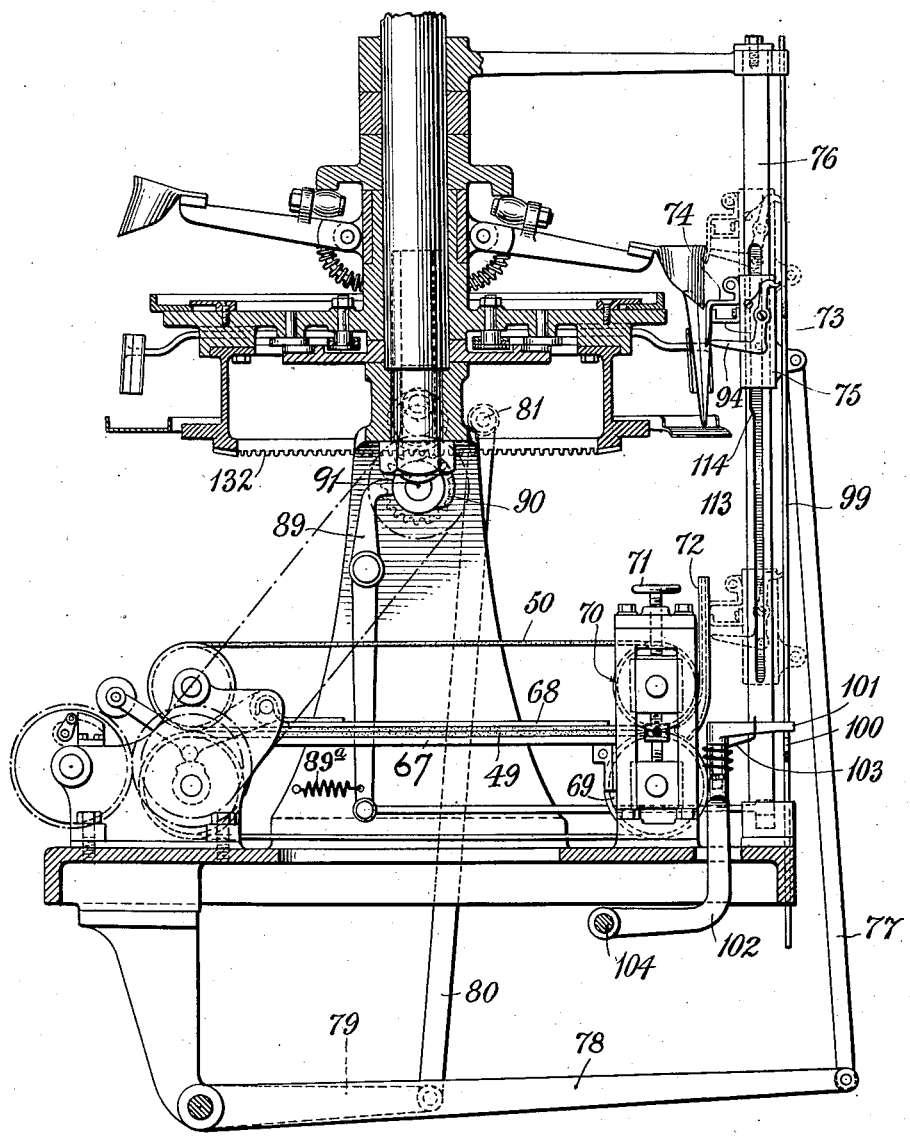
Figure 4:
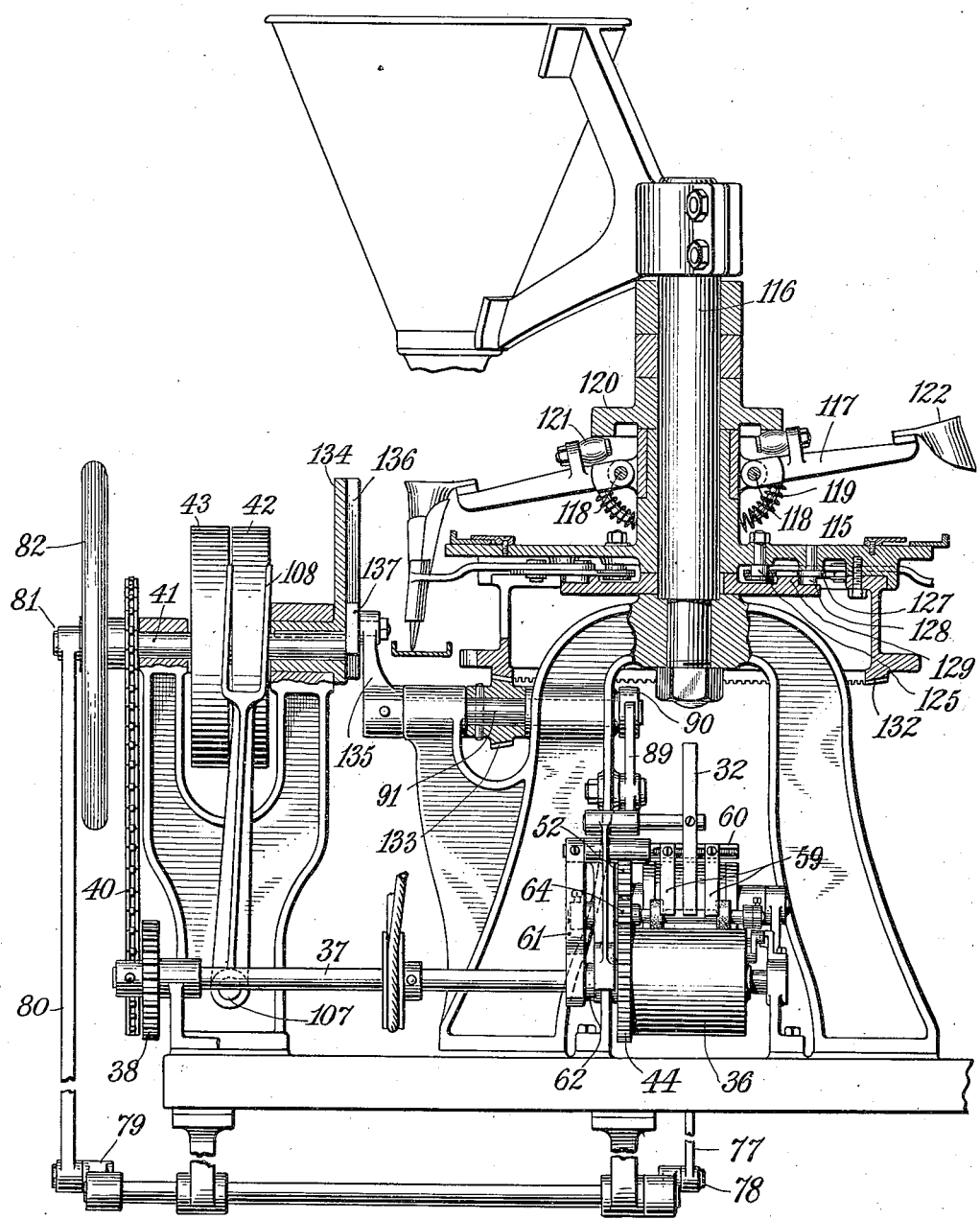

Of the accompanying drawings, which illustrate a preferred embodiment, Figure 1 represents a plan view of the machine. Fig. 2 represents an elevation of the left side. Fig. 3 represents a vertical section on the line 3—3 of Fig. 1. Fig. 4 represents a partial front elevation and median vertical section. Fig. 5 represents a vertical section on the line 5—5 of Fig. 1. Fig. 6 represents an elevation of the right-hand side of the bag-lifter. Fig. 7 represents a plan view of the mechanism associated with the discharge opening of the hopper. Fig. 8 represents a section on the line 8—8 of Fig. 1. Fig. 9 represents a plan of one of the revolving bag-carriers. Fig. 9ª represents a rear elevation of one of the funnels and bag-carriers with a bag positioned thereon. Fig. 10 represents a vertical section of the means for feeding the empty bags from a stack. Fig. 11 represents a similar view with the parts in a different position. Fig. 12 represents an axial section of the bag-feeding roll. Fig. 13 represents an elevation of the lifter about to grasp a bag delivered by the bag-feeding devices. Fig. 14 represents a rear elevation showing the lifter and stop motion. Fig. 15 represents a vertical section of a part of the gumming mechanism. Fig. 16 represents a plan of the lip-turning, folding and pressing devices. Figs. 17, 18, 19, and 20 represent sections on the correspondingly-numbered lines of Fig. 16. Fig. 21 represents a plan of the revolving bag-carriers and the packer for the filled envelops. Fig. 22 represents a vertical section of the packer. Fig. 23 represents a rear elevation of the bag-filling means. Fig. 24 represents an elevation of the left side thereof. Fig. 25 represents a vertical section of parts of the material feeder. Fig. 26 represents a front elevation of this feeder, partly in section.

In general, the features of this machine are as follows. First, the empty bags are stacked in a vertical pile, open end first and flap side uppermost. A revolving feed-roll provided with a gripper, takes the lowermost bag and advances it from under the pile, toward the throat between two conveyer belts, which then carry the bags in procession horizontally under a revolving table to a curved guide which turns the bags into a vertical position ready to be elevated by a vertically-reciprocating lifter. The latter comprises a pair of jaws which grasp the lip of the bag and draw it up onto one of a series of funnels, said jaws having associated with them a feeler controlling certain mechanism which arrests the machine when no bag is present. The funnels are carried around horizontally with an intermittent motion, during the pauses of which the bags are drawn onto the funnels, and below each funnel is a pair of carrier jaws converging upwardly so as to open the bag as the latter is drawn between said jaws onto the funnel, and also adapted to hold the bag after it is filled and while the funnel is withdrawn. The bag is carried horizontally under the filling mechanism, which charges it during a pause, and from there, still moving in a horizontal arc, it passes between a belt and a backing-ring which keep it from tilting while the flap is being gummed by a pasting device and folded over to seal the mouth, after which the bag is taken by a wheel and another belt which hold the sealed end under pressure between them and from thence it is dropped in front of a reciprocating presser which stores the filled and sealed bags in a horizontal pack ready for removal.

The mechanism for holding the empty bags in a stack and feeding them therefrom, which is shown principally in Figs. 1, 3, 4, 10, 11 and 12, forms the subject of a separate application, Serial No. 576,111, and need only be briefly described. Any other suitable bag-feeding mechanism may of course be used in its place. I believe myself however to be the first to automatically feed the bags one by one to a conveyer such as the belts 49, 50 hereinafter described, whereby they are advanced edgewise in procession to a mechanism which applies the bags to a funnel or series of funnels or other bag-holders, and this combination forms a part of my present invention. 30 is the stack platform with vertical guides 31 and a front stop 32 for holding the bags 33 in a vertical pile with their flaps 34 impinging against the stop and their under lips 35 presented downwardly. In this description the flap side or ply of the bag is considered the back, and the under-lip side or ply the front. 36 is a feed roll mounted on a shaft 37 which is rotated by a spur and chain gearing 38, 39, 40 from the main driving-shaft 41 carrying the fast and loose belt-pulleys 42, 43, said feed roll being provided with a gear 44 whereby, through an intermediate pinion 45 and gear 46, is driven a shaft 47 having a pulley 48 which carries the lower one of a pair of conveyer belts 49, 50, the upper belt passing around a pulley 51 having a gear 52 which meshes with the gear 46. On a rock shaft 53 within the feed roll is a gripper 54 retracted in the direction of rotation of the roll by a spring 55, and having an arm 56 whose stud 57 intermittently engages and is turned backward against the tension of spring 55 by a stationary segmental cam 58. This cam produces a backward oscillation of the gripper at a faster rate than the forward progression of the roll periphery, so that the lower lip of the lowermost bag is grasped and the latter drawn down under the stop 32 and started from under the pile. A kicker or agitator 59 mounted on a rock shaft 60 at one end of which is an arm 61 engaged by a cam 62 on the shaft of the feed roll, serves to loosen the remainder of the pack from the bag which is being withdrawn. After the gripper 54 has advanced the bag a short distance it flies back into the interior of the feed roll and a presser roll 63 then comes down upon the periphery of the feed roll 36 and meshes its gear 64 with the feed-roll gear 44, whereby the bag is advanced into the throat between the conveyer belts. Roll 63 is carried by a rock-frame 65 operated by a cam 66 on the lower belt-pulley shaft 47, whereby the reciprocating motion is imparted which allows the presser roll to avoid the gripper.

The operative stretch of the lower belt is supported on a stationary table 67 (Fig. 3) and that of the upper belt is held down by a hinged plate 68. At the remote ends of these stretches the belts 49, 50 pass around a pair of idle pulleys 69, 70, whose bearings have a vertical screw adjustment 71.

The belts 49, 50 advance the bags horizontally in procession from the bag-feeding devices into a curved guide 72 which engages the side edges of the bags and turns them into a vertical position ready to be grasped by the lifter and carried to the upper or bag-filling level. The reason for feeding the bags endwise in procession to the lifter instead of taking them directly from the face of a pack by means of the lifter, is that the bags, being thicker at their bottoms than at their mouth ends, would form a pack from the end of which it would be difficult for the lifter to take the foremost bag. I do not however wholly confine myself to the feeding of the bags to the lifter in the particular manner described.

The lifter comprises a fixed jaw 73 fastened to, and a movable jaw 74 pivoted on, a slide 75 which moves up and down on a vertical guide 76 and is reciprocated through a link 77, rock-arms 78, 79, and a pitman 80 from a wrist-pin 81 carried by a hand-wheel 82 on the main driving shaft 41.

For operation of the movable lifter-jaw 74 there is a spring 83 for yieldingly holding this jaw against the fixed jaw 73 (see Figs. 6 and 13), and a roller stud 84 engaging the front edge of a pendulous bar 85 (Figs. 2, 13 and 14), this bar being hung on a pivot 86 from the upper end of the guide 76, and its lower end swung by a horizontal lever 87, link 88, vertical lever 89 retracted by spring 89ᵃ, and a cam 90 (Figs. 3 and 4) on a horizontal shaft 91 driven from the shaft 41. As the lifter on its downward movement approaches guide 72 in which a bag is presented, the bar 85 swings forward against the stud 84 and opens the movable jaw 74 so as to admit the forward or under lip of the bag between the two jaws and allow the beak or nose of the movable jaw to enter the mouth of the bag.

Near its upper end, the bar 85 has a cam projection 93 the purpose of which is to slightly separate the movable jaw from the fixed jaw of the lifter near the upper end of the latter's stroke when the bag has been drawn onto one of the funnels as shown by full lines in Figs. 2 and 3, and thereby permit the further upward movement of the lifter and its withdrawal from the bag without tearing the latter. While the lifter pauses at the top of its stroke, the funnel carrying the bag moves horizontally from underneath the lifter and offers a free path for the descent of the latter to take a fresh bag from the curved guide.

When the lifter descends to take the bag from guide 72, the beak of the movable jaw 74 in separating from the fixed jaw 73 presses the back ply of the bag slightly away from the front ply thereof, as shown in Fig. 13, and descends a considerable distance into the opening of the bag until the fixed jaw comes opposite the under lip (see lower dotted position of the lifter in Fig. 3), whereupon the bar 85 retreats, the lifter jaws close upon the lip of the bag, and the lifter ascends carrying the bag with it from the guide 72 to the upper or bag-filled level where it places the bag in one of the holders composed of carrier jaws and funnel, as hereinafter described.

Believing myself to be the first to individually grasp and lift or otherwise draw a bag, mouth foremost, into a holder or onto a funnel through which it is filled, or to feed the bags one-by-one to a lifter or other drawing device for performing this function, I do not intend to limit myself to the particular devices herein shown for performing these operations.

Associated with the lifter is a stop-motion device including a feeler 94 pivoted at 95 to the slide 75 and having a nose adapted to project through an aperture 96 in the jaw 74 (Fig. 6) after the lifter has failed to find a bag in the guide 72 at the lower end of its stroke, and having also a notched end 97 adapted to encounter or avoid, according as the bag is absent or present, a shoulder 98 (Figs. 6 and 14) on a vertically sliding stop-bar 99 mounted alongside of the lifter-guide 76. This bar has a projection 100 at its lower end coöperating with a latch 101 turning on the upper end of an arm 102 and normally projected into operative position by a spring 103. The projection 101 is beveled on its lower side so that in descending it displaces the latch 101 and the latter springs back over the projection. Arm 102 is mounted on a rock-shaft 104 which carries a stop or filler 105 movable into and out of the path of the heel of a hand-lever 106, the latter being attached to the shaft 107 of a belt-shipper 108 whereby the driving belt 109 (Fig. 2) is shifted from the fast pulley 42 to the loose pulley 43 and vice versa. A spring 110 connected with the lower end of the hand-lever normally tends to ship the belt from the fast to the loose pulley, but when the hand-lever is turned to move the belt onto the fast pulley and thus start the machine in operation, the weight of the connections including arm 102 on the rear side of rock-shaft 104 draws the stop into the path of the hand-lever and maintains the shipper in a running position.

A spring 111 on the lifter slide 75, pressing against the upper arm of the feeler 94 tends to hold a stud 112 on the lower arm of the feeler against the front edge of a vertical slot 113 in the guide 76, said slot having a narrow lower part and a wide upper part between which is a cam-shoulder 114. As the lifter descends, this cam-shoulder retracts the feeler to permit the entrance of the bag lip between the lifter jaws, and if a bag is present in the guide 72 to be elevated by the lifter, the front ply of the bag keeps the lifter retracted when the stud 112 enters the wide part of the slot. This causes the notched end 97 of the feeler to avoid the shoulder 98 on stop-bar 99, but if the bag is missing, this shoulder will be encountered and the lifter will raise bar 99, causing the projection 100 to oscillate the arm 102 and withdraw the stop 105 from the path of hand-lever 106, whereupon the spring 110 causes the belt to be shifted and the machine automatically stopped.

115 is a wheel or table mounted to revolve on a fixed vertical spindle 116 and carrying a series of radial funnel arms 117, here shown as six in number, pivoted at points 118 to the hub of the table. These arms are elevated by springs 119 and depressed by a stationary cam 120 whose lower acting face engages rollers 121 on the funnel arms, the arrangement being such that the funnels are depressed just before they come in front of the lifter, and elevated again after passing the filling devices and before reaching the gumming mechanism.

At the outer ends of the arms 117 are funnels 122, whose lower rims are beveled to engage the mouth edges of the bag and enable the latter to be readily drawn upon the funnels after the bag has been partly opened by the carriers underneath the funnels.

The rotary table 115 has on its lower side a series of bag-carriers mounted below the several funnels and each composed of a pair of jaws 123, 123 which are V-shaped in horizontal section and converge upwardly as represented in Fig. 9ª so that when a bag 33 is drawn by the lifter up between the jaws onto one of the funnels 122 it will be opened in order to receive the snout of the funnel, the latter, because of its tapered shape, completing the opening. Thus, while the jaws coöperate with the funnels, they are below the latter and hold the bags independently of the funnels.

As I believe it to be new with me to embrace or open a flat bag by externally engaging and converging the side edges of its mouth to permit the filling of the bag, or to hold it between jaws while a funnel previously positioned in the bag is being withdrawn during the course of a horizontal edgewise progression of the bag, I do not limit myself to the employment of the exact devices shown for performing these operations.

The carrier jaws are attached to arms 124 pivoted on studs 125 and drawn together by springs 126. Between each pair of arms is interposed a cam 127 whose stud carries a short arm 128 which drags against a stationary cam 129, the latter having two steps 130, 131, as seen in Fig. 21, whereby the jaws are first opened slightly to permit the proper alinement of the filled bag as the latter approaches the gumming mechanism, and then more fully to permit its departure from the arc of travel of the funnels and carriers into the embrace of the belt and wheel which holds the adherent surfaces of the sealed bag under pressure. Then just before coming opposite the lifter again, each pair of carrier jaws closes to receive and open a fresh bag as described.

A bevel gear 132 on the lower side of table 115 meshes with a bevel pinion 133 (Fig. 4) on the driven shaft 91, which latter, it will be noted, is parallel and out of line with the driving shaft 41. Intermittent motion is imparted from the driving to the driven shaft by means of cranks 134, 135 on the respective shafts, having a sliding connection consisting of a radial groove 136 in the driving-crank 134 occupied by a wrist-block 137 on the driven crank 135. The circular path of this wrist-block embraces the axis of crank 134, eccentrically, and therefore when the cranks are up, as shown in Fig. 4, the uniform rotation of the driving shaft imparts to the driven shaft a relatively slow motion which amounts to a pause or rest, and a relatively fast motion when the cranks are down. This mechanism for securing an intermittent rotation operates more quietly and with less racking than the pawl and ratchet or other devices heretofore employed in rotary bag-filling machines, and is also positive or incapable of "over-throw." The pauses of the table are nearly full stops, and during these pauses the lifter 73, 74 locates the bags successively on the funnels, and the filling mechanism during the next pause charges the bag through the funnel. This filling mechanism *per se*, which I will now briefly describe, forms the subject of a separate application, Serial No. 576,112, and any other bag-filling means may be used in its place, but the combination of an automatic stop-motion with the measuring slides or other means for automatically shutting off the flow of material when the machine is stopped, forms a part of my present invention. 138 is a hopper for the seed, powder, or other material with which the bags are to be filled, the same containing a stirrer 139 on a vertical shaft 140 which is rotated by a belt 141 passing over a pulley 142 on said shaft, a pulley 143 on the shaft 37, and a pair of idle pulleys 144. The lower or discharge mouth of this funnel or hopper is provided with a measuring device consisting of an iris diaphragm composed of a pair of slides 145, 146 adapted to include an adjustable opening between them, whereby the rate of flow of the material is apportioned to the rate of progression of the bag-holders. Slide 145 is attached to a slide-bar 147 which connects with the slide 146 by a lever 148 pivoted at a fixed point 149 so that the slides have equal opposite movements. 150 is a hand lever with a fixed fulcrum at 151 and a slotted connection with a stud 152 on the slide bar 147, whereby the slides may be opened against the tension of a spring 153 attached to this stud. The maximum opening is determined by a gage nut 154 abutting against a fixed stop 155 and having its position with relation to the slide bar 147 varied by means of an adjusting screw 156 rotatable in an ear 157 on the slide bar, but prevented from moving longitudinally therein. The upper end of nut 154 is a pointer coöperating with an index 158 on the slide bar to show the amount of opening. These slides are also controlled by the stop-motion device through the medium of a stop screw 159, in the path of the heel of hand-lever 150 and mounted on a lever 160 connected by a link 161 with an arm 162 on the shaft 104 previously described, so that when feeler 94 on the lifter slide detects the absence of a bag and stops the machine, the stop screw 159 will also be moved out of the path of hand lever 150 and the slides will be closed by their spring 153 so as to stop the flow of material from the hopper. 163 is a three-vaned rotary charge-segregating and charge-propelling valve mounted on a horizontal shaft 164 in a casing 165 below the measuring slides, said shaft having fixed to it a three-pointed cam 166 against which a roller 167 is held by a spring 168 attached to a pivoted arm 169 carrying the roller. This cam carries a pin 170 working with lost motion in a segmental depression 171 in the hub 172 of a bevel-gear wheel 173 loose on the feeder shaft 164, and gear 173 meshes with a second bevel-gear 174 carrying a star wheel 175 which is tripped at the proper times by a series of studs 176 on the table 115. The first part of the movement of the three-vaned feeder wheel or valve, when actuated by one of the studs 176 and the intervening mechanism, is uniform, and the last portion is accelerated through the action of the cam, spring and lost-motion device as will be readily understood.

After the bag receives a charge of material, the funnel rises to withdraw from its mouth while the carrier jaws are still closed on the bag, and then these jaws open slightly so that the bag will remain loosely embraced in the holder formed by the jaws and funnel, its lower edge being supported on a stationary segmental platform 180. In this condition its trailing edge is propelled by one of the pair of carrier jaws, which then advances the bag into the space between a horizontally revolving backing-ring 178 and a belt 179 (Figs. 1 and 5) which clamp the bag in a zone slightly below its upper end while carrying it through the gumming and flap-turning devices.

A flange 181 holds the backing-ring 178 down against the surface of table 115 and a pair of rollers 182, 183 (Fig. 1) inside of the rim of the backing-ring cause the latter to describe a path eccentric to the axis of rotation of the table and of the funnels and bag carriers, the backing-ring being carried around merely by the driving friction of the table and the belt 179. The purpose of this eccentricity is to keep the bags away from the backing-ring while they are being located in the holders and filled under the hopper 138, and permit them to be vertically alined on the platform 180 when the holders open as described, after which the bags are supported against the backing-ring during the gumming and flap-turning operations.

Belt 179 follows a segment of the backing-ring 178 and is carried by idle-pulleys 184, 185, 186 and driven by the smaller cylinder 187 of a large stepped pulley 188, the latter being intermittently rotated in time with the table 115 by bevel gearing 189, 190, 191 from the table gear 132 (Fig. 8).

The gumming or pasting mechanism here shown (to the specific construction of which I do not herein lay claim or limit myself) comprises a pot 192 (Figs. 1 and 5) for holding the liquid adhesive material (or for holding water if the flaps are already gummed), a gum-lifting wheel 193 rotating on a horizontal shaft 194 with the lower portion of the wheel immersed in the gum, said wheel having a groove 195 formed on its inner face, a transfer wheel 196 rotating on a vertical shaft 197 with its edge occupying the uppermost part of the groove 195 whereby the gum is carried around to the lip of the envelop as indicated by the relation of the parts in Figs. 5 and 15, and a spring-guide 198 for supporting the back of the envelop flap and formed with an aperture 199 to receive the margin of the transfer wheel 196 when no bag is present. There is also included a wiper 200 in the form of a plate pivoted at 201 and adjustable by a thumb-screw 202 for removing excess gum from the rising part of groove 195, a fixed wiper-plate 200ª below the adjustable wiper 200 for clearing the rest of the grooved face of the wheel, and another wiper 203 embracing the approaching edge of the transfer wheel 196 for clearing any gum from the upper and lower faces of said wheel.

Transfer wheel 196 rolls a streak of gum onto the flap of the envelop as the latter passes between said wheel and the spring-guide 198, and immediately thereafter the flap is turned into a horizontal position, as indicated in Fig. 17, by means of a horizontally-oscillating flap-turner 205 intermittently projected over the upper edge of a fixed segmental former 204 by a series of studs 206 on the revolving table 115, and retracted by a spring 207. This flap-turner is pivoted to a stud 208 which carries the roll 183 on one arm of a fixed spider 209.

From the flap-turner 205 and former 204 the bag immediately passes into a fixed segmental flap-folder 210, successive sections of which are shown in Figs. 18, 19, and 20, said folder causing the bent gummed flap to be turned down upon the under lip of the bag, whereby the latter becomes sealed. Next, the upper end of the sealed bag passes between the larger cylinder 211 of wheel 188 and a belt 212 which partially encircles the same and passes around the idle pulleys 183 and 213 carried on the arms of the spider 209. This belt and wheel hold the gummed surfaces under pressure until the bag reaches a chute 214, U-shaped in horizontal section, which arrests the bag released from the belt and momentarily holds it with its lower edge resting on a shelf 215 (see Figs. 21, 22) formed at the upper end of a reciprocating plunger or presser 216, the latter being mounted on a slide 217 which is connected with a bell-crank 218 having a roller 219 engaged by a cam 220 revolving with the table 115, the bell-crank being retracted by a spring 221. The U-shaped chute 214 and the shelf 215 have the effect of alining the envelop in a vertical position before it drops through a guide or chute section 222 on the plunger in front of the acting face of said plunger. This takes place when the plunger has been retracted to the dotted-line position shown in Fig. 22, and on its next forward reciprocation the plunger carries the bag into a guide-way 223, the sides of this guideway having spring catches 224 which yield to permit the accession of each succeeding bag but which prevent the face of the pack from returning with the plunger as the latter is retracted. A suitable friction block or follower (not shown) may be placed in the guide-way to support the back of the pack.

While I have not attempted to show any modifications in the mode of organizing the elements of my invention or in the specific structure of the devices for performing the several described operations upon the bags, it will be understood that considerable variation of embodiment is contemplated as within the scope of the invention, both as a whole and in its several parts.

I claim,—

1. In a bag-filling machine, the combination of a series of bag-holders, means for automatically and separately grasping the bags and raising them into conjunction with said holders, and means for presenting the bags in succession to said grasping means.

2. In a bag-filling machine, the combination of a horizontally-revolving series of bag-holders, means for grasping the bags individually and automatically drawing them successively up into conjunction with said holders, and means for filling the bags in said holders.

3. In a bag-filling machine, the combination of a horizontally-revolving series of funnels, means for automatically and separately grasping the bags and raising them onto said funnels, and means for presenting the bags in succession to said grasping means.

4. In a bag-filling machine, the combination of a bag-holder having a pair of upwardly-convergent jaws adapted to externally embrace the side edges of a flat bag to hold the bag open, and means for relatively moving said jaws to open and close them.

5. The combination of a funnel, mechanism for grasping a flat bag and placing it upon the funnel, and means for externally engaging and contracting the side edges of the bag to open the latter as the bag is advanced upon the funnel.

6. The combination of a funnel to enter the mouth of a flat bag, means for grasping the bag and placing it upon the funnel, jaws for engaging the side edges of the bag and opening it during the placing movement, and means for opening said jaws to release the bag.

7. In a bag-filling machine, the combination of a pair of upwardly-convergent jaws to engage the side edges of a flat bag, means for drawing the bag upwardly mouth-end first between said jaws to open the bag, and means for filling a bag held between said jaws.

8. In a bag-filling machine, the combination of a horizontally-revolving series of funnels, a series of pairs of carrier jaws below said funnels for holding open the bags thereon, means for opening and closing said jaws, and means for automatically raising the bags between said jaws onto the funnels.

9. The combination of a funnel to enter the mouth of a flat bag, means for grasping the bag and placing it upon the funnel, external bag-contracting means for exerting lateral edgewise pressure to open the bag, and operating devices for opening said bag-contracting means and for withdrawing the funnel to release the bag.

10. The combination of a horizontally revolving funnel to enter the mouth of a bag, and a pair of upwardly-convergent carrier jaws positioned below said funnel for engaging the side edges of an upwardly drawn bag and opening the mouth of the bag to receive the snout of the funnel.

11. The combination of a horizontally movable funnel, means for drawing a bag up onto said funnel, means for filling the bag, means for holding the bag by its side edges while being filled, and means for withdrawing the funnel upwardly from the filled bag while so held.

12. The combination of a horizontally revolving funnel mounted for rising and falling movement, a bag carrier independently supported below said funnel to revolve therewith, means for automatically filling the bag, and means for automatically withdrawing the funnel upwardly from the mouth of the bag held by said carrier.

13. The combination of a horizontally revolving funnel having a falling movement to reach its bag-filling level and a rising movement to release the bag, a revolving pair of carrier jaws below said funnel, and means for automatically separating said jaws to release the bag.

14. The combination of a horizontally revolving funnel, a cam to force said funnel downwardly to its bag-filling level, a spring to raise the funnel, and means for automatically raising a bag onto said funnel while the latter is in its depressed position.

15. The combination of a horizontally revolving support having a radial series of funnel arms pivoted to move in vertical planes, funnels at the outer ends of said arms, springs to raise the outer ends of the arms in succession, a stationary cam to successively depress the outer ends of the arms, and means for automatically drawing bags in succession mouth-foremost up onto said funnels while in their depressed positions.

16. The combination of means for holding flat bags horizontally in a stack with their flaps projecting in the direction of feeding movement, feeding means for advancing the bags singly, mouth-foremost from the lower face of the stack, means for conveying the bag horizontally and then upwardly to the filling devices, and means for filling the bags in their upright position.

17. The combination of means for holding a bag in position to be filled, a lifter for raising the bag into conjunction with said holding-means, a feeder for taking the bags one-by-one from a stack, and a conveyer for carrying the bags from the feeder to the lifter.

18. The combination of means for holding a stack of bags, a feeder for taking the bags one-by-one from said stack, an endless conveyer for carrying the bags away from said feeder, bag holding means, means for filling the bags in said holding means, and means for advancing the bags from said conveyer to said holding means.

19. The combination of a horizontally-revolving bag-holder, means for supporting a stack of bags below said holder, means for feeding the bags from the stack and advancing them under the plane of revolution of the holder, means for lifting the bags into conjunction with the holder, and means for filling the bags in the holder.

20. The combination of a horizontally rotating table having means for holding the bags while being filled, a supporter for a stack of bags located at one side of and below the table, means at the opposite side of the table for lifting the bags into conjunction with the bag holding means, a feeder for taking the bags from the face of the stack, and an endless conveyer for carrying the bags from the feeder under the table to the lifting means.

21. The combination of means for holding a bag in position to be filled, a lifter for raising the bags into conjunction with said holding-means, means for conveying the bags in a horizontal posture edgewise in procession to said lifter, and means for turning the bags into an upright posture for engagement by the lifter.

22. The combination of a holder to position a bag while being filled, a conveyer for advancing the bags edgewise in procession with their flaps extended, and means for grasping the mouth edge of the bags delivered by said conveyer and drawing them mouth-end foremost into conjunction with the holding means.

23. The combination of means for holding a flat bag while being filled, a conveyer for advancing the bags in procession mouth-end foremost, a stationary curved guide for turning the course of the bags, and means for grasping the mouth edge of the bag and drawing it into conjunction with the holding means.

24. The combination of a horizontally revolving series of bag-holders, a horizontal conveyer under said series of holders for advancing the bags mouth-foremost, a curved guide for turning the bags into a vertical plane, and a lifter for taking the bags from said guide and raising them into conjunction with the holders.

25. In a bag-filling machine, the combination of a bag-holder, a lifter having jaws for grasping the lip of a flat bag and drawing it up into conjunction with said holder, and means for operating said lifter to raise and lower it and to open and close its jaws.

26. The combination of means for holding a bag while being filled, means for presenting the bag mouth-foremost, and reciprocating means including a pair of co-acting jaws one of which enters the mouth of the bag while the other engages the outside of its under lip for grasping the bag and drawing it mouth-foremost into conjunction with said holding means.

27. The combination of a horizontally-movable bag-holder, means for presenting the bags below said holder, a lifter for grasping the bags and drawing them up into conjunction with the holder, said lifter comprising a pair of jaws for engaging opposite sides of the under lip of the bag, means for imparting a rising and falling movement to said lifter, and means for relatively opening and closing said jaws.

28. The combination of a revolving series of funnels, means for charging the bags through said funnels, and means for drawing the bags onto said funnels comprising a reciprocating pair of jaws adapted to grasp a lip of the bag between them.

29. The combination of a bag-holder, a reciprocating pair of jaws adapted to grasp a bag and draw it into conjunction with said holder, and a stationarily-mounted reciprocating member for operating said jaws to control their relative opening and closing movement.

30. The combination of a bag-holder, a lifter slide, a stationary vertical guide-structure for said slide, a pair of lifting jaws mounted on said slide and adapted to grasp the bag and draw it into conjunction with the holder, one of said jaws being movable and retracted by a spring, a pendulous bar pivoted to said guide and adapted to engage and open the movable jaw, and means for oscillating said bar.

31. The combination of a bag-holder, a vertical lifter-guide, a pair of lifter jaws mounted to reciprocate on said guide and adapted to grasp the bag and draw it up into conjunction with said holder, a pendulous bar having a cam for opening the jaws as they approach the limit of their upward movement, and means for oscillating said bar to open the jaws as they descend to grasp the bag, and to effect their closure upon the lip of the bag.

32. The combination of means for holding a bag to be filled, a lifter for drawing the bag upwardly into conjunction with said means, a feeler associated with said lifter for detecting the presence of the bag, and means controlled by said feeler for stopping the machine when a bag is missing.

33. The combination of a revolving series of bag-holders, means for grasping the bags and placing them in succession in said holders, and a stop-motion device having a feeler associated with said grasping means for arresting the machine when a bag is missing.

34. The combination of a series of bag-holders, means for grasping the bags and placing them in succession in said holders, bag-filling means, means for applying power to drive the aforesaid elements, a shipper predisposed to effect the disconnection of the power, a stop device controlling the shipper for maintaining the power connection, and a feeler associated with said grasping means and controlling said device.

35. The combination of a bag-holder, a reciprocating bag-grasping device for placing the bags in the holder, a spring-projected feeler associated with said grasping device, means for positively retracting said feeler, and a stationarily-mounted machine-stopping member encountered by said feeler when the latter is projected, and avoided by the feeler when the latter is retracted.

36. The combination of a bag-grasping device, a slide on which the latter is mounted, a spring-projected feeler mounted on said slide, a stationary guide for said slide formed with a cam for retracting the feeler, a stationarily-mounted member encountered or avoided by said feeler according as the latter is projected or retracted, and stop-mechanism connected with said member for arresting the machine.

37. In a bag-filling machine, the combination of a bag-holder, means for intermittently propelling the same in a horizontal orbit, means for grasping a bag individually by its mouth lip and drawing it onto said holder during a pause in the latter's movement, and means for filling the bag during a subsequent pause.

38. The combination of a horizontally-movable series of bag-holders, means for imparting intermittent circular progression thereto, and devices located at successive fixed points around the circle and adapted during successive pauses to grasp the bags individually by their mouth lips and draw them onto the holders, and to fill the bags.

39. The combination of a member rotated horizontally at a fixed level and having a series of funnels at its periphery, means for automatically associating the bags with the funnels, means for filling the bags through the funnels, means for withdrawing the funnels, and means for sealing the bags while still positioned under the funnels.

40. The combination of a horizontally-movable series of bag-holders adapted to be opened and closed, means for imparting intermittent progression thereto, devices for applying the bags to the holders and for charging the bags during their pauses, means for opening the holders after the bags have left the charging device, and means for sealing the bags while in the opened holders.

41. The combination of bag-filling and sealing devices, means for carrying the bags upwardly in succession to the filling level, and means for carrying the bags horizontally at the same level from the filling device through the sealing device.

42. The combination of a revolving series of funnels, a series of bag-carriers mounted below and revolving with said funnels, bag-filling means, means for automatically opening the carriers after the bags are filled, and a platform for supporting the bottoms of the filled bags while loose in the carriers.

43. In a bag-filling machine, the combination of a horizontally revolving series of bag-holders, means for filling and sealing the bags at successive points around the circle traversed by said holders, and a support which comes into engagement with the backs of the bags after they are filled and remains in engagement while they are being sealed.

44. In a bag-filling machine, the combination of means for imparting a horizontal edgewise progression to the bags at one level, means for filling and sealing the bags in succession during such progression, and devices traveling on opposite sides of the bag for clamping a zone of the bag below the sealing zone during the sealing operation.

45. The combination of bag-filling means, a backing-ring and traveling belt for clamping the bags between them in an upright position, and means for sealing the bags so clamped.

46. The combination of a revolving series of holders for flat bags, means for filling and sealing the bags while in said holders, a circular back-support for the bags eccentric to the orbit of the holders, and a front support coöperating therewith to hold the bags from tilting edgewise while being sealed.

47. The combination of a revolving series of bag-holders, means for filling the bags, means for gumming and turning their flaps, a ring eccentric to the path of the bag-holders for supporting the backs of the bags while being gummed, and a belt coöperating with said ring for engaging the fronts of the bags.

48. The combination of a horizontally revolving series of bag-holders, means for sealing the bags, a belt for engaging the fronts of the bags while being sealed, and a ring frictionally rotated by said belt for supporting the backs of the bags.

49. The combination of a horizontally revolving series of funnels, means for filling and sealing the bags, means for retracting the funnels upwardly from the bags after the latter are filled, and means acting thereafter to clamp the upper portions of the bags during their progression under the retracted funnels while being sealed.

50. The combination of a horizontally revolving series of funnels, means for filling the bags therethrough, means for retracting the funnels from the bags when the latter are filled, means for gumming the flaps of the bags during their horizontal progression below the retracted funnels, a belt for engaging the front sides of the bags while being gummed, and a rotary support for the backs of the bags coöperating with said belt.

51. The combination of means for carrying a series of bags in a continuous horizontal path at one level, a horizontally revolving series of funnels adapted to occupy the mouths of the bags during a portion of such traverse, and means for automatically filling the bags through said funnels, withdrawing the funnels upwardly, gumming and folding the flaps of the bags, and holding the folded flaps under pressure during succeeding portions of such horizontal traverse of the bags.

52. The combination of means for carrying a series of bags in a substantially horizontal arc at one level, means for filling the bags and gumming and folding their flaps while so carried, and means for carrying the bags with their flaps under pressure in a path departing from said arc in the same horizontal plane.

53. The combination of means for filling bags in succession, means for gumming and folding the flaps of the bags, a backing-ring and a pulley located on opposite sides of the path of the bags, for supporting the latter while their flaps are being gummed and held under pressure, and bag-clamping belts coöperating with said ring and pulley respectively anterior and posterior to the flap-folding means.

54. The combination of devices for filling and sealing a series of bags, means for advancing the bags horizontally edgewise through the sealing device, a packer, and means for momentarily arresting and alining each sealed bag and then dropping it into said packer.

55. The combination of means for advancing a series of bags horizontally edgewise, devices for filling and sealing the bags, a chute for arresting and dropping the sealed bags, and a plunger reciprocated under the mouth of said chute and having a shelf on which the bag temporarily rests before dropping.

56. The combination of means for advancing a series of bags horizontally edgewise, devices for filling and sealing the bags, a chute substantially U-shaped in a horizontal plane, against which the advancing bags are arrested and through which they drop by gravity, and a packer located below the mouth of said chute.

57. The combination of devices for filling and sealing a series of flat bags, a chute through which the sealed bags are dropped, a horizontally reciprocating plunger in front of which they are dropped, and a holder for storing the packed bags, having catch-devices adapted to yield to admit the bags advanced by the plunger and prevent the return of the face of the pack.

58. In a bag-filling machine, the combination of a hopper having a discharge-opening, means for presenting a series of bags in succession to be filled from said hopper, means for detecting the absence of a bag, and mechanism controlled by said detecting means for automatically closing the discharge-opening of said hopper when a bag is absent.

59. The combination of a hopper for the filling material, a measuring diaphragm at the mouth thereof adjustable to vary the size of the discharge-opening, means for presenting bags in succession to be filled from the hopper, means for detecting the absence of a bag, and mechanism controlled by said detecting means for automatically operating said diaphragm to shut off the flow from the hopper when a bag is absent.

60. In a bag-filling machine, the combination of a device for grasping a bag to be filled, a bag-feeler associated therewith, bag-charging means, means for applying power to drive the aforesaid elements, and means controlled by said feeler for coincidently disconnecting the power and shutting off the flow of material through said charging means.

61. In a bag-filling machine, the combination of a series of bag-holders, means for drawing the bags in succession onto said holders, a bag-feeler associated with the said means, a hopper for the filling material, means for applying power to drive the aforesaid devices, and means controlled by said feeler for coincidently disconnecting the power and shutting off the discharge of material from the hopper.

In testimony whereof I have hereunto set my hand in the presence of two subscribing witnesses, this 11th day of November 1909.

GUY L. HOYT.

Witnesses:
 WM. E. CUNON,
 WILLIAM ROEGELE.